United States Patent [19]
Zettl

[11] Patent Number: 4,651,600
[45] Date of Patent: Mar. 24, 1987

[54] INTERCHANGEABLE CUTTING DIE OR TOOL HEAD ARRANGEMENT

[76] Inventor: Otto Zettl, Fellenbergstr. 9,, D-8969 Reicholzried bei Dietmannried, Fed. Rep. of Germany

[21] Appl. No.: 835,521

[22] Filed: Mar. 3, 1986

[30] Foreign Application Priority Data

Mar. 13, 1985 [DE] Fed. Rep. of Germany ....... 3508963

[51] Int. Cl.⁴ .............................................. B23B 21/00
[52] U.S. Cl. .................. 82/36 B; 408/239 R
[58] Field of Search ................... 82/36 A, 36 B, 36 R; 408/239 R; 29/568

[56] References Cited

U.S. PATENT DOCUMENTS

| | | | |
|---|---|---|---|
| 1,027,535 | 5/1912 | Fogarty | 82/36 R |
| 3,422,710 | 1/1969 | Kilmer | 82/36 R |
| 3,555,943 | 1/1971 | Papp | 82/36 B |
| 4,043,229 | 8/1977 | Ortlieb | 82/36 R |

FOREIGN PATENT DOCUMENTS 2659183  7/1978  Fed. Rep. of Germany ...... 82/36 B

Primary Examiner—M. Jordan
Attorney, Agent, or Firm—Angelo Notaro

[57] ABSTRACT

A carrier and a head having fastened thereon a cutting place are connected with one another exclusively by a form-fit coupling. A first contact surface of the head grips under the carrier. A second contact surface of the head above the first surface grips behind an abutment of the carrier and a third contact surface of the head arranged between the first and second contact surfaces thereof serves for transmission of the cutting load.

10 Claims, 5 Drawing Figures

INTERCHANGEABLE CUTTING DIE OR TOOL HEAD ARRANGEMENT

BACKGROUND OF THE INVENTION

The invention relates to a quick interchangeable cutting tool head arrangement, comprising a head which supports a cutting tool and a carrier which is fastened at a machine tool as a lathe. The head and the carrier form a coupling which allows to quickly interchange heads provided with cutting tools.

Known couplings of this kind use guide ways provided at the carrier. The head is positively guided at the guide ways and clamped at the carrier by holding means as clamping bolts or a threaded rod. The clamping means are loaded by at least a portion of the cutting load. Handling of a coupling of this type requires a plurality of operations for mounting and dismounting the die head. Therefore, these couplings cannot be used for an automated die change. Further, the holding means are high-loaded by the cutting load and must be strong enough for the maximum cutting load. Nevertheless the clamping means can become loosened by vibrations and substantial damages of the machine will result.

BRIEF SUMMARY OF THE INVENTION

In order to avoid the above mentioned disadvantages it is one object of the invention to provide a quick interchange coupling which needs no clamping means influenced by the cutting load.

Further objects of the invention are to provide a novel coupling concept which allows an easy connection of the coupling parts and enables an automated replacement of the cutting die.

A further object of the invention is to provide a cutting die arrangement in which the die head apart from a simple safety means against movement by vibrations is exclusively held at the carrier in a form-fit manner.

A further object of the invention is to provide a coupling of a die head and a carrier in which the latter is free from any operational elements and in which the head can be disconnected by a special small movement in form of a rearward swing, i.e. a swing in such direction that the cutting die is moved against the cutting load direction.

A very important further object of the invention is to provide a coupling arrangement between a cutting head and a carrier, in which the head must perform two different movements one after another to separate it from the carrier.

These and other objects, features and advantages of the invention will become apparent from the following description, the claims and the drawings.

DESCRIPTION OF THE PREFERRED EMBODIMENTS

Figure 1:
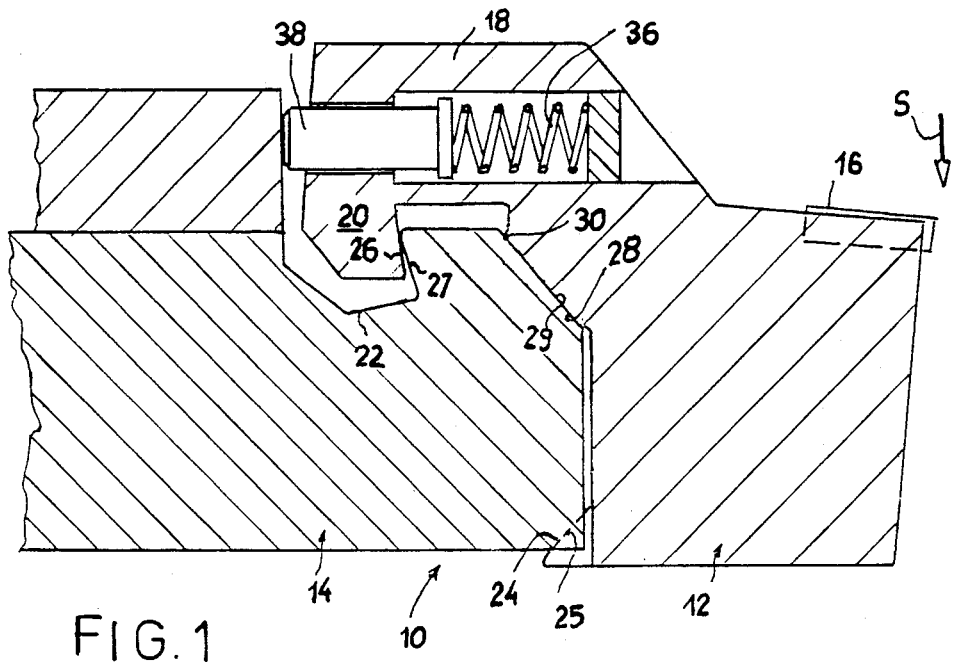
FIG. 1 shows a longitudinal section of a preferred embodiment of a coupling taken along line 1—1 of FIG. 2.

In the following description and claims the term "downward" means "in direction of the cutting load" marked by S in FIG. 1. "Upward" means the opposite direction. If in a special application the cutting load is applied in another direction for example a horizontal direction then "downward" is not related to the gravity but to the direction of the cutting force alone. The same is true with respect to the terms upper and lower. "Forward" means a direction pointing to a cutting die 16 which is fastened at the front end of a head 12. A "rearward swing" is a movement by which the cutting die 16 is displaced in counterdirection with respect to the cutting load S.

A quick interchangeable coupling 10 comprises the head 12 having fastened the cutting tool or die 16 on the upper surface of the front end thereof and a carrier 14. The head 12 is interchangeably coupled at its rearward end with the front end of the carrier exclusively in a form-fit manner. The head 12 is loaded by the cutting force S which in this instance is directed downwards. Three contact areas are provided between the rearward end of the head 12 and the front end of the carrier 14. A first contact area comprises a lower head surface 24 abutting against and undergripping a lower carrier surface 25. A second contact area comprises a front abutting surface 27 provided in a recess 22 formed in an upper carrier surface or area, and a front surface 26 provided at a nose 20 which extends downwards at the rearward end of an upper head projection 18. The projection 18 is integral with the head 12 and projects rearwardly therefrom. The nose 20 is spaced from a bottom surface of the recess 22. A third contact area is composed of a head supporting surface 28 and a carrier supporting surface 29. This pair of supporting surfaces 28,29 extend in an inclined plane forming an angle between 30° and 60° with the cutting load S and are spaced above the first contact area 24,25 and are arranged substantially at the same level in front of the second contact area 26,27.

The cutting load is transmitted from the head 12 to the carrier at the third contact area 28,29 and therefore, the supporting surfaces thereof must at least extend with a geometrical component rectangularly with respect to the load direction S. That means, the supporting surfaces 28, 29 can be arranged horizontally in this instance or inclined but must not run vertically.

All surfaces 24 to 29 of the three contact areas extend at right angles to one and the same vertical plane which is the plane of section in FIG. 1. In order to ensure that the head 12 cannot be displaced transversely a form-fit arrangement is provided which comprises a projection 34 at the middle portion of the lower carrier surface 25 and an inserting opening 32 for the projection 34. The opening 32 is formed in the inclined lower head surface 24. The projection 34 and the opening 32 which opens to the rearward side have complementary configurations and comprise planar vertical side faces, which form an angle in the range of 60° to 120° with one another. The projection 34 fits into the opening 32 without any transverse clearance and in addition a self-centering effect is gained.

The third contact area 28,29 prevents a downward movement of the head 12 with respect to the carrier 14 and the first contact area 24,25 prevents an upward movement. The first and third contact areas together prevent a rearward movement and the second contact area prevents a forward movement and also a forward swing i.e. a swinging movement in clock-wise direction. Therefore, only one movement is possible to disconnect the head 12 from the carrier. That is a rearward swing i.e. a swinging movement of the head 12 in counter-clock-wise direction about the upmost edge 30 of the third contact area 28, 29. In normal operation this rearward swing is prevented by the cutting load. If no cutting load does exist the head 12 can be swung rearwardly about edge 30. Thereby the cutting die is lifted and the nose 20 dips deeper into the recess 22. The lower head surface 24 gets out of its undergripping position with respect to the carrier 14 (see the dot and dashes position in FIG. 3) and then the head 12 can be lifted and separated from the carrier 14.

It is important that the head 12 must perform two different movements one after another to separate it from the carrier. Both of these that movements are against the force and the moment resulting from the cutting load.

The front surfaces 26,27 of the second contact area are substantially parallel with the direction of the cutting load. In practice the front surface must be slightly relieved so that the lower front end of the nose 20 can be displaced slightly forwards during the rearward swing . Therefore the contact surfaces 26,27 form a very small angle with one another which is overdone in FIG. 1 for better understanding.

During operation no further means are necessary to securely hold the head 12 in working position. However, if no cutting load is applied and vibrations occur the head could unintentionally be swung into its opening position. To prevent this a safety device is provided acting against a downward movement of the nose 20. According to FIG. 1 this safety device consists of a stem 38 displaceably guided in a bore of the projection 18 of the head 12 and projecting at the rearward end thereof and a weak spring 36 urging the stem 38 rearwards. The stem abuts against a block fastened on the carrier 14. The spring 36 pre-loads the head 12 by a moment which increases the moment resulting from the cutting load. The safety device 36, 38 in no way does absorb cutting forces but even operate to increase those cutting forces. The front surface of the block on the carrier 14 can be inclined to provide for an automated coupling operation.

Figure 2:
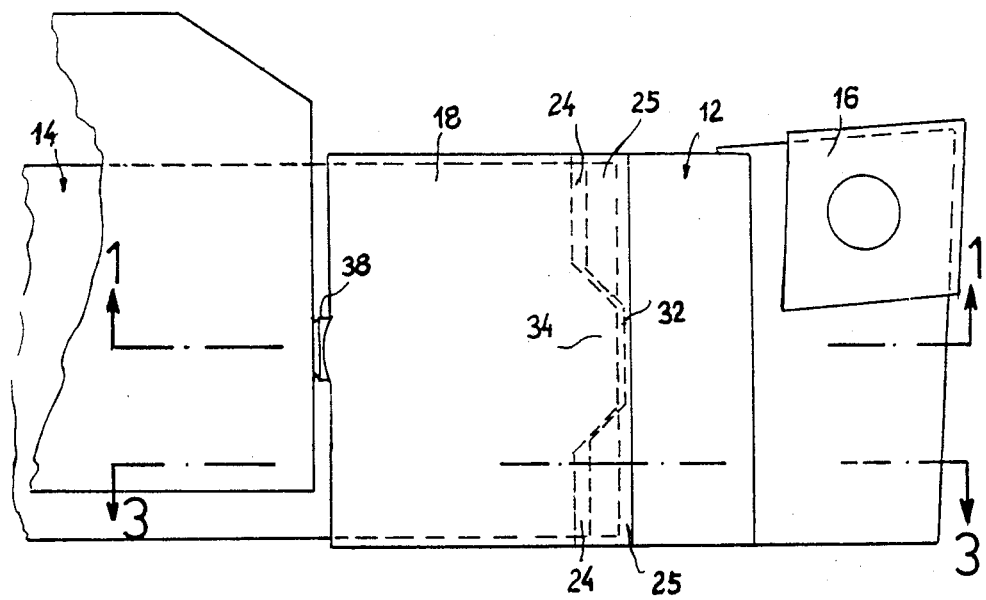
FIG. 2 shows a plan view of the coupling.
Figure 3:
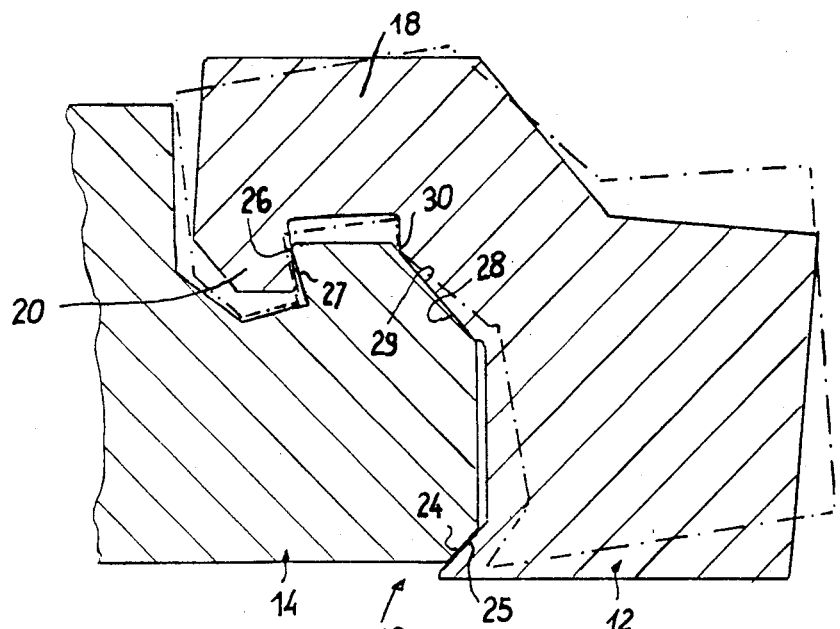
FIG. 3 shows a longitudinal section of the coupling taken along line 3—3 of FIG. 2.
Figure 4:
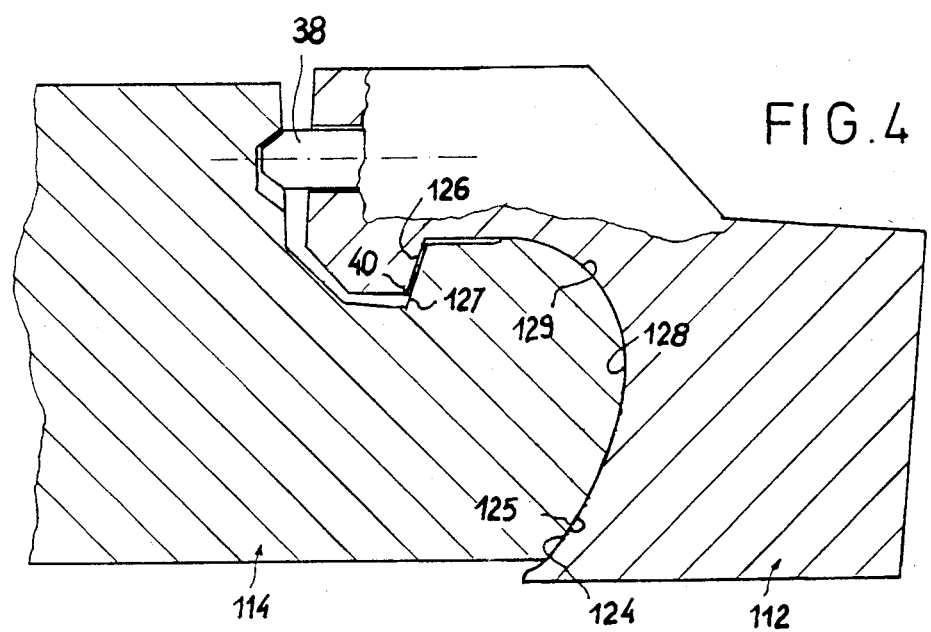
FIG. 4 shows a longitudinal section of an alternative embodiment of a coupling.

The embodiment shown in FIG. 4 differs from the embodiment according to FIG. 1 to 3 in that the first and third contact areas 124, 125 and 128,129 are connected with one another and are curved. The surfaces 126, 127 of the second contact area are substantially parallel with one another and inclined upwards in forward direction. The angle between the front surfaces 126, 127 and an imaginary line connecting the lowest point 40 of the second contact area with the lowest point of the first contact area 124,125 must be greater than 90°. Otherwise the surface 127 cannot prevent the head 112 from swinging forwards about the first contact area 124,125. In this embodiment the head 112 is swung rearwards about this point 40 into its open position.

The three contact areas 124 to 129 between the head 112 and the carrier 114 are arranged on a substantially C-shaped line. The first contact area 124,125 forms the lower end and the second contact area 126,127 forms the upper end of the C-line. The third contact area 128,129 is situated in the upper half of the C-shaped line. The head contact surface 124 must undergrip the carrier 114 and the front surface 126 at the upper end of the C-shaped line must grip behind the contact surface 127 of the carrier 114. With this configuration the head 112 after having been swung in counter-clockwise direction can be removed from the carrier along an inclined path.

Figure 5:
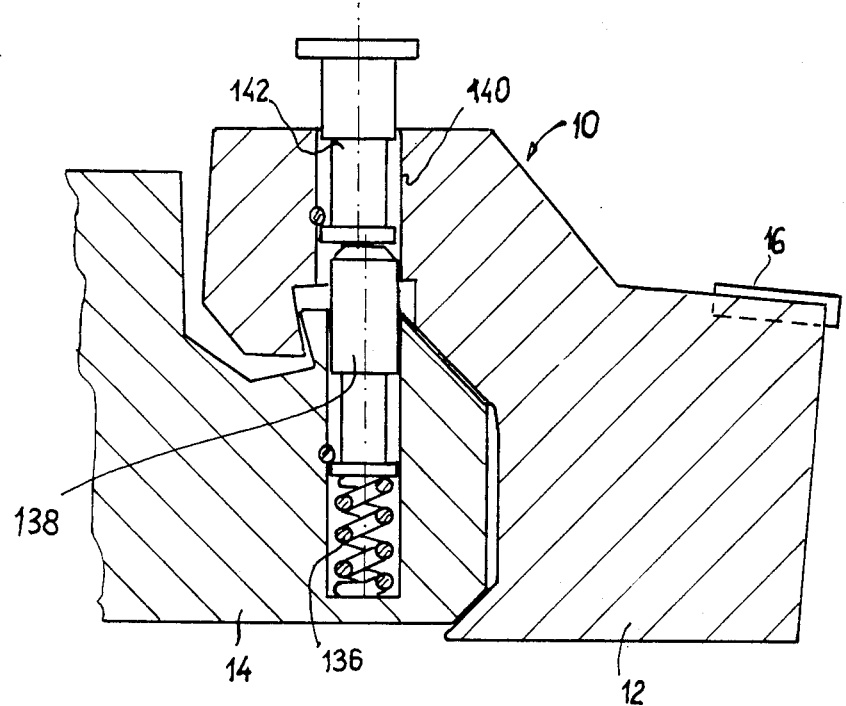
FIG. 5 shows a longitudinal section of the coupling according to FIGS. 1 to 3 but provided with a modified safety means.

According to FIG. 5 a safety device comprises a stem 138 which is displaceably guided in a bore of the carrier 14 in parallel relationship with the cutting load. The stem projects upwards from the carrier and is pre-loaded upwardly by a spring 136. The head 12 has a vertical bore 140, the forward generating line thereof coinciding with that of the carrier bore. An operating plug 142 is vertically displaceable in the bore 140. The stem 138 projects into the bore 140 and prevents a backward swing of the head 12 positively, namely in a from-fit manner. The stem 138 automatically takes its locking position when the head is swung into the operational position thereof. The head 12 can be unlocked by pressing down the plug 142.

I claim:

1. A quick interchangeable cutting die head arrangement comprising a head, a cutting die fastened at a front end of the head, a carrier, the head interchangeably coupled at its rearward end in a form-fit manner with a front end of the carrier, the cutting die when loaded by a cutting load in a downward direction fastened at an upper surface of the head, three contact areas provided between the rearward end of the head and the front end of the carrier, a first contact area comprising a lower head surface abutting against and under-gripping a lower carrier surface, a second contact area comprising a front abutting surface provided in a recess formed in an upper carrier surface and a front surface provided at a nose downwardly extending from a rearwardly extending projection of the head, the nose spaced from a bottom surface of the recess and a third contact area arranged above the first contact area and in front of the second contact area and comprising a head supporting surface and a carrier supporting surface, the latter surfaces each at least with a component extending rectangularly with respect to the load direction, the surfaces of said three contact areas rectangularly arranged with respect to one and the same plane containing the load direction, a form-fit arrangement provided between the head and the carrier preventing a relative motion between the head and the carrier in a perpendicular direction with respect to said plane, the head thereby being free only to be swung about an axis parallel with said perpendicular direction with the nose dipping deeper into the recess, and a safety device counteracting said dipping of the nose independent on the cutting load, the safety device arranged at one of elements consisting of the head and the carrier.

2. An arrangement as claimed in claim 1, wherein the second and third contact areas are arranged substantially on the same level perpendicularly to the load direction.

3. An arrangement as claimed in claim 1, wherein the lower head surface and the lower carrier surface are arranged in an oblique plane forming an angle in the region from 30° to 60° with the cutting load direction and inclined downwards in rearward direction.

4. An arrangement as claimed in claim 1, wherein the head supporting surface and the carrier supporting surface are arranged in an oblique plane forming an angle in the region from 30° to 60° with the cutting load direction and inclined upwards in rearward direction.

5. An arrangement as claimed in claim 1, wherein the cutting die and at least one of the second and third contact areas are arranged substantially on the same level perpendicular to the cutting load direction.

6. An arrangement as claimed in claim 1, wherein the form-fit arrangement comprises a projection and a complementary opening, a pair of side faces are provided at the projection and in the opening, the side faces of the projection contacting those of the opening, the side faces of each pair of side faces forming an acute angle with one another and providing a self-centering means.

7. An arrangement as claimed in claim 6, wherein the form-fit arrangement is formed in one of the contact areas.

8. An arrangement as claimed in claim 1, wherein the safety device comprises a spring-biased movable element pre-loading the head in the same sense as the cutting load.

9. An arrangement as claimed in claim 1, wherein the safety device comprises a catch arranged at one of the elements comprising the head and the carrier and being in interlocking engagement with the other one of said elements.

10. An arrangement as claimed in claim 1, wherein the three contact areas are arranged on a substantially C-shaped line, as seen in a longitudinal section, the first and the second contact areas forming the ends of the C-shaped line and the third contact area situated in the upper half of the C-shaped line and spaced from the second contact area.

* * * * *